United States Patent [19]

Clark et al.

[11] Patent Number: 4,934,254
[45] Date of Patent: Jun. 19, 1990

[54] FACE SEAL WITH LONG-WEARING SEALING SURFACE

[76] Inventors: Eugene V. Clark, 19801 Gresham, Northridge, Calif. 91324; George K. Sievers, 1605 W. Magnolia Blvd., Burbank, Calif. 91506

[21] Appl. No.: 594,694

[22] Filed: Mar. 29, 1984

Related U.S. Application Data

[63] Continuation of Ser. No. 381,339, May 24, 1982, abandoned.

[51] Int. Cl.$^5$ ............................ F16J 15/34; C23C 9/02
[52] U.S. Cl. ..................................... 277/96.2; 277/236; 277/DIG. 6; 428/678; 428/941; 748/6.3; 427/253
[58] Field of Search .................. 277/96, 96.1, 235 R, 277/236, 96.2, 235 A, DIG. 6; 428/547, 610, 941, 678, 679, 680, 681, 591, 938; 427/252, 253; 148/6, 6.3; 308/DIG. 8, 241; 464/9, 42, 45

[56] References Cited

U.S. PATENT DOCUMENTS

| | | |
|---|---|---|
| 3,029,162 | 4/1962 | Samuel et al. . |
| 3,257,230 | 6/1966 | Wachtell et al. . |
| 3,575,433 | 4/1971 | Beyer et al. ...................... 277/235 A |
| 3,622,374 | 11/1971 | Pike . |
| 3,810,637 | 5/1974 | Bonvin ................................ 277/96.2 |
| 3,935,034 | 1/1976 | Hayes . |
| 3,947,046 | 3/1976 | Maruyama et al. . |
| 4,122,240 | 10/1978 | Banas et al. ...................... 277/96.2 X |
| 4,132,419 | 1/1979 | Sunami et al. ...................... 277/96.2 |
| 4,157,923 | 6/1979 | Yen et al. ........................ 277/96.2 X |

FOREIGN PATENT DOCUMENTS

| | | |
|---|---|---|
| 53-148657 | 12/1978 | Japan . |
| 54-108164 | 8/1979 | Japan .................................. 277/96.2 |
| WO83/04293 | 12/1983 | PCT Int'l Appl. ................ 277/96.2 |

*Primary Examiner*—Robert S. Ward
*Attorney, Agent, or Firm*—Louis J. Bachand

[57] ABSTRACT

Mechanical seals are improved in wear properties, erosion, corrosion and galling resistance by forming a diffusion coating in the seal structure surface comprising an intermetallic compound of the seal structure iron, nickel or cobalt base metal and one or more of aluminum, boron, silicon and carbon.

27 Claims, 1 Drawing Sheet

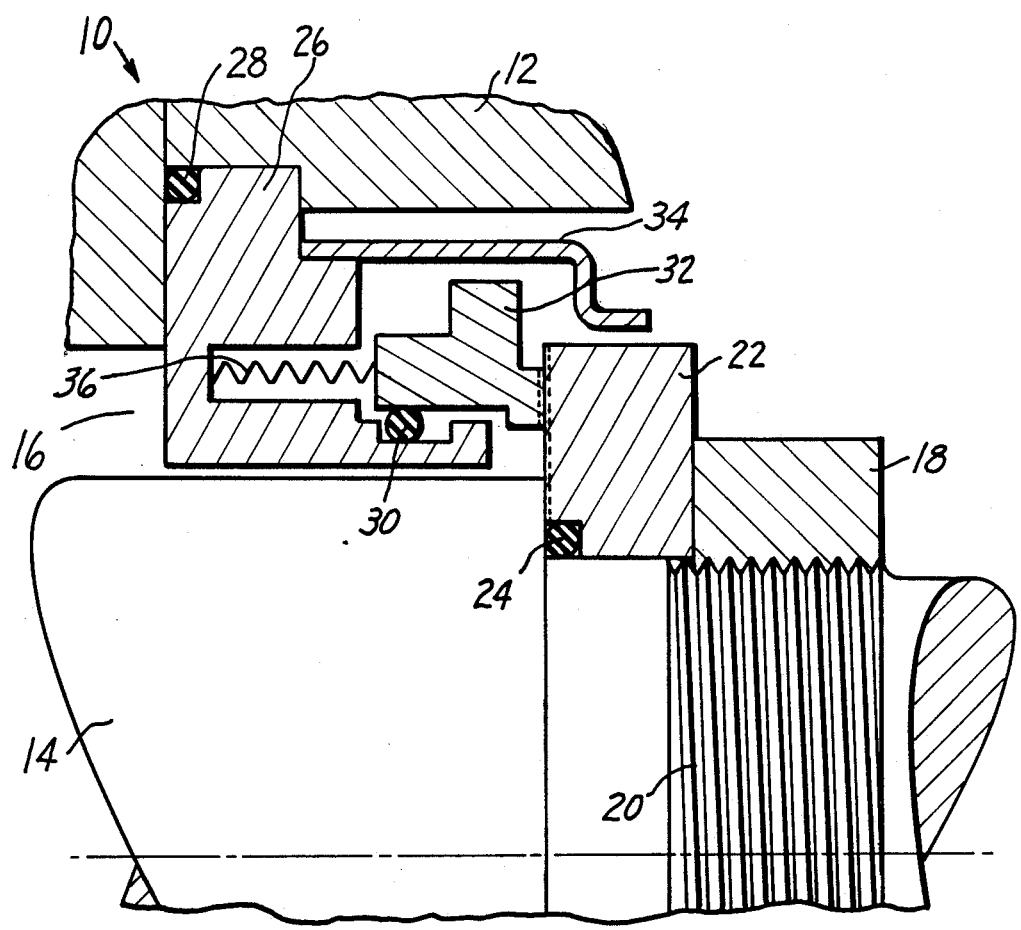

FACE SEAL WITH LONG-WEARING SEALING SURFACE

This application is a continuation of application Ser. No. 381,339, filed May 24, 1982 and now abandoned.

TECHNICAL FIELD

This invention has to do with improvements in mechanical seal structures, and more particularly with sealing surface modified mechanical seal structures providing tailored erosion and corrosion resistance, reduced operating friction, substantial absence of galling, and effective sealing for greatly extended periods over like structures without the surface modifications taught herein.

BACKGROUND ART

Mechanical seals are seals defined by cooperating first and second structure parts having close fitting planar or curved surfaces. Shaft seals and ball and seat valves are examples of mechanical seal applications. Typically the cooperating parts of mechanical seal structures are formed of metals such as Stellite alloy or like iron, nickel or cobalt base alloys, which may contain chromium, tantalum, molybedenum, titanium, silicon and carbon and the like for the specific properties associated with these elements. Other structures are cermets which comprise non-metallic materials bonded by a metal binder, e.g. such as silicon carbide, the refractory carbides, nitrides, silicides, and borides of metals such as tungsten, tantalum, titanium and zirconium, and a base metal binder of typically cobalt, nickel or iron. The term "nickel base", "cobalt base" or "iron base" herein refers to nickel, iron or cobalt respectively being the largest single metal component present, although such metal may not be a major weight proportion of the structure overall. For example, a cobalt base tungsten carbide structure typically contains about 6% by weight cobalt which acts as the binder in cermet structures made from the tungsten carbide.

Mechanical seals employ a supersmooth interface between opposed cooperating parts, usually one of which rotates or moves linearly relative to the other, the surfaces of the seal structures which engage being lapped smooth to define a fluid seal when in contact, without use of gaskets, seal rings, lubricating films or other foreign expedients. Because the opposed members move relative to one another, maintainence of sealing effect depends on precision of fit initially, and over time on wear resistance. Because there is no lubricating film between the relatively moving seal structures, lubricity of their surfaces is important. Because the constant intimate contact of the members wears one or both of the surfaces, uniformity of wear characteristic is a significant factor in effective mechanical seal design.

Controlling the rate and type of wear is the chief problem in maintaining a good mechanical seal. Since the seals are established between very hard, close-fitting surfaces without intervention of gaskets or lubricants, the sealing surfaces are subjected to wearing contact as a means of sealing. Mechanisms of failure include frictional wear which must over time abrade the seal surfaces until no seal is left. If this were the only failure mechanism, seal life could be determined by the thickness of the sealing surfaces, and parts such as pump seals could be designed with certainty as to service lives. Other factors, however, are typically limitative of seal life, causing premature seal failure, i.e. failure well before the surfaces are abraded past sealing capability. One such factor is thermal degradation. Heat caused by the unlubricated frictional engagement of the seal surfaces can reach levels destructive of the seal structure. Another factor is localized surface destruction, caused by scratching of one surface by the other, which can be exacerbated by the presence of hard particulate in the fluid being handled, with resultant leaking and seal failure. Another problem is metal transfer from one surface to the opposed surface. This phenomenon is seen in galling of the structure surfaces as portions of one surface leave and become attached to the opposite surface, producing surface defects on both structures and thus leakage and failure of the seal.

It has now been discovered that premature failure in mechanical seals, that is failure brought about by heat degradation, scratching, galling and like factors can be reduced substantially by surface diffusing the mechanical seal structures at the areas of sealing contact with an element forming an intermetallic compound with the base metal of the structure. This diffusion, suitably from a diffusion pack in accordance with well known diffusion pack technologies, produces intermetallic compounds such as cobalt or nickel aluminides, depending on the base metal and the diffusing metal, in the structure surface. The intermetallic compound modified surfaces have been found to greatly improve the mechanical seal capability of conventional mechanical structures such as those formed of Stellite alloy and cobalt base tungsten carbide. For example, the seal surfaces are galling resistant. The intermetallic compound modified structure surface is resistant to interboundary metal transfer thus effectively blocking the underlying phenomenon of galling. Moreover, surface friction is reduced, lowering temperatures at the interface of the seal parts, contributing to longer seal life and limiting thermal degradation of the seal structures. Additionally, the surface diffusion coatings have their own determinable erosion, corrosion, hardness, and other properties which can be imparted to the structure surface as desired by the primary diffusants themselves in forming the intermetallic compounds, or by added elements such as titanium for extra hardness.

It is a major object of the invention therefore to provide mechanical seals in which the seal defining structures are surface diffusion coated to form intermetallic compounds with the base metal of the structure, thereby lengthening the life and improving the effectiveness of such seals in widely different use environments. It is another object to diffusion coat mechanical seal structure surfaces to alter the response mechanism of such sealing surface to heat, erosion, corrosion and the like. It is a specific object of the present invention to provide to control metal transfer phenomena between mechanical seal surfaces and thereby control premature deterioration of the surfaces, and to increase the lubricity in mechanical seal surfaces, and thus reduce adverse effects caused or aggravated by excessive friction.

These and other objects of the invention to become apparent hereinafter are realized in a mechanical seal having a first part comprising an iron, nickel or cobalt base structure, and a relatively movable second part cooperating therewith, the first part structure having in contact with the second part in mechanical seal defining relation a surface layer consisting essentially of a diffusion coating-formed intermetallic compound of the base metal.

In particular embodiments, the second part comprises an iron, nickel or cobalt base structure, typically having in contact with the first part structure a surface layer consisting essentially of a diffusion coating-formed intermetallic compound of the base metal.

Preferably in the present mechanical seals, the intermetallic compound comprises the base metal and at least one of aluminum, boron, silicon, and carbon, and particularly the intermetallic compound comprises iron, nickel, cobalt or iron nickel aluminide, or comprises iron, nickel, cobalt or iron nickel boride. In other embodiments the intermetallic compound comprises iron, nickel, cobalt, iron nickel, silicon or boron carbide. In still other embodiments, the intermetallic compound comprises iron, nickel, cobalt or boron silicide.

Typically, in the mechanical seals according to the invention, the sealing surface layer intermetallic compound contains about 30% aluminum by weight and the balance nickel, iron or cobalt. Alternatively, the sealing surface layer intermetallic compound can contain about 10% by weight boron and the balance nickel, iron or cobalt. Preferably the surface layer comprises nickel aluminide, and may further comprise small but effective amounts of tantalum, molybdenum, chromium, zirconium, titanium or silicon diffused into the surface layer.

In particular embodiments, mechanical seal first part structure comprises a silicon or refractory metal carbide, nitride or boride and a base metal binder, such as nickel, iron or cobalt. The preferred refractory metal carbides are tungsten, tantalum, titanium or zirconium carbides, and the preferred borides tungsten, tantalum, titanium or zirconium borides.

Preferably in silicon and refractory carbide structures, the intermetallic compound comprises an aluminide of one or more of the base metals, e.g. and particularly, nickel aluminide.

Typically in the present mechanical seals the surface layer is about 0.05 millimeter in depth, and can range from 0.02 to 0.04 millimeter.

The invention further contemplates the method of forming a long wearing mechanical sealing surface on a nickel, iron or cobalt base structure which includes diffusing an intermetallic compound forming element, e.g. aluminum, into the surface of the structure from a diffusion pack e.g. an aluminizing pack under intermetallic compound forming conditions with the base metal.

Further contemplated is selecting a cobalt base tungsten carbide cermet structure or a cobalt base metal structure as the mechanical seal defining structure, and diffusing boron into the structure from a boronizing pack.

THE DRAWING

The invention will be further described in connection with the attached drawing in which: The FIGURE is a vertical section of a rotating shaft mechanical seal in which the sealing contact surfaces have been surface diffused with an intermetallic compound forming element in accordance with the invention.

PREFERRED MODES

Turning now to the drawing a rotary shaft seal to a housing is indicated at 10, comprising housing wall 12, shaft 14, and mechanical seal structures 16. A follower 18 threaded onto threads 20 or the shaft 14 secures ring 22, defining the rotating, first part of the mechanical seal structure 16, to the shaft sealed there by O-ring 24.

The second, cooperating part of the mechanical seal structures 16 is defined by annular member 32, centered on the shaft 14 in spaced relation and in surface contact with an opposed face of the first seal part, ring 22, as shown. Member 32 is supported in ring 22 contact by a series of spring elements 36, which in turn are carried by an annular element 26. The element 26 is perimetrically fixed to the housing 12 and sealed at the housing by O-ring 28, and at the seal member 32 by O-ring 30. A shroud 34 encloses the mechanical sealing area.

The operation of the mechanical seal structures is conventional. Rotation of the shaft 14 carries the first part, ring 22 angularly. The second, cooperating part 32 is urged into contact with the rotating part 22 effecting a seal by the pressure responsive intimate contact between the highly lapped, smooth surfaces of the two parts 22, 32.

As indicated by the dotted outline in the drawing at their opposed, intimately contacting surfaces, parts 22, 32, are surface modified in accordance with the invention. A diffusion coating-formed intermetallic compound at the surface replaces the conventional surface, with the result of lower friction, increased wear, galling resistance, and improved reliability over a greater service life.

Diffusion coating, unlike other coating procedures forms new material extending to both sides of the original surface boundary on the part surface. By diffusing an intermetallic compound forming element such as aluminum from a diffusion pack at high temperatures and for extended periods, the original surface is replaced with an intermetallic compound by reaction of the aluminum with the base metal of the part. Thus a nickel base part will be converted to nickel aluminide at the part surface. Where the part is a cermet, e.g. cobalt base tungsten carbide, the part surface after diffusion coating comprises the intermetallic of cobalt and aluminum surrounding the tungsten carbide.

Diffusion coating processes are well known. Typical boronizing packs useful in the present invention are described in U.S. Pat. No. 3,029,162 to Samuel et al. Typical aluminizing packs and diffusing conditions useful herein are described in U.S. Pat. No. 3,257,230 To Wachtell et al. The pack diffusion disclosures of these patents are incorporated by reference herein.

EXAMPLES

EXAMPLE 1

All parts and percentages are by weight. A shaft seal like that depicted in the drawing was diffusion coated selectively at the face seal portions. The structures defining the face seal were 61% cobalt-tungsten carbide elements. An aluminum diffusion pack comprising about 5% aluminum, about 95% aluminum oxide and about 0.1% of a halide carrier was prepared. The structure parts were face surface exposed to the pack heated to between 500° and 1000° C. for from 5 to 10 hours, while oxygen was excluded. A diffusion coating bridging the original part boundary was produced, comprising an intermetallic compound of cobalt aluminide (containing about 30% aluminum) to a depth of about 0.05 millimeter. The intermetalic compound surrounded and supported the tungsten carbide particles of the structure.

A mechanical seal defined by these coated structures was placed in service between a shaft and ousing on a pump. Like cobalt-tungsten carbide structures without diffusion coating formation of the intermetallic compound typically last about 300 hours on this pump before becoming unserviceable due to thermal degradation induced heat checking and metal transfer galling. The diffusion coated seal structures of the invention, however, are still serviceable at 1000 hours and their use continues. Friction heating is moderated by the relative lubricity of the diffusion coating. Further, the wear in the invention coated structures is long term abrasive wear, rather than thermal degradation, oxidation or metal transfer as in the uncoated structures. The invention thus achieves the objective of removing thermal degradation, galling and like premature failure modes as the limiting factors in service life, and making long term abrasion the determinant of ultimate service life. Duplication of this example with a nickel base structure provides similar results and a more corrosion resistant coating.

EXAMPLE 2

A ball valve and seat fabricated of an austenitic stainless steel and defining a mechanical seal in a highly erosive environment typically roughened after a few closures from particle impact, and metal transfer, allowing leakage through the valve. Using a boronizing pack containing about 5% boron, about 95% alumina, and a halide carrier, temperatures above about 500° C. and heating times of about 5 to 10 hours in a nonoxidizing atmosphere, the steel parts were diffusion coated forming iron boride intermetalic compound at the seal surfaces to a depth of about 0.05 millimeter. Tests on the coated parts demonstrate reduced wear and a substantial absence of galling or other manifestation of interboundary metal transfer. Sealing is effective and long lived despite use in the highly erosive environment. In addition to boron and aluminum, there may also be used silicon and carbon to form the intermetalic compounds. Typical steels improved by the present invention are the hardenable grade steels.

The foregoing diffusion coatings can be modified to provide special properties by the incorporation of tantalum, molybedenum, chromium, zirconium, titanium and silicon, e.g. by co- or successive diffusion into the part surface. In such modifications the characteristic surface intermetallic compound must be retained in order that the benefits of the invention, not obtainable with mere solution-type alloys, e.g. of chromium be realized.

In summary, the objectives of lengthened life, improved effectiveness, absence of galling or metal transfer, resistance to thermal degradation and reduced friction in mechanical seals are met in the structures having the diffusion coated surfaces according to the invention.

We claim:

1. Method of forming a long wearing mechanical sealing surface on a nickel, iron or cobalt base structure which includes diffusing an intermetallic compound forming element into the surface of said structure from a diffusion pack under intermetallic compound forming conditions with said base metal to form an intermetallic compound defining said mechanical sealing surface.

2. Mechanical seal having a first part comprising an iron, nickel or cobalt base structure having a structure surface, and a relatively movable second part cooperating with said first part structure at said surface, said first part structure having in contact with said second part in mechanical seal-defining relation a surface layer replacing said structure surface and consisting essentially of a diffusion coating-formed intermetallic compound of the base metal.

3. Mechanical seal according to claim 2, in which said second part comprises an iron, nickel or cobalt base structure.

4. Mechanical seal according to claim 2, in which said second part comprises an iron, nickel or cobalt base structure, said second part structure having a surface in contact with said first part structure surface and consisting essentially of a diffusion coating-formed intermetallic compound of the base metal.

5. Mechanical seal according to claim 2, in which said compound comprises said base metal and at least one of aluminum, boron, silicon, and carbon, and extends to both sides of the original surface boundary of said structure surface.

6. Mechanical seal according to claim 4, in which said compound comprises iron, nickel, cobalt or iron nickel aluminide.

7. Mechanical seal according to claim 4, in which said compound comprises iron, nickel, or cobalt boride.

8. Mechanical seal according to claim 4, in which said compound comprises iron, cobalt, iron, nickel, silicon or boron carbide.

9. Mechanical seal according to claim 4 in which said compound comprises iron, nickel, cobalt or boron silicide.

10. Mechanical seal according to claim 2, in which said surface layer compound contains about 30% aluminum by weight and the balance nickel, iron or cobalt.

11. Mechanical seal according to claim 2, in which said surface layer compound contains about 10% boron by weight and the balance nickel, iron or cobalt.

12. Mechanical seal according to claim 11, in which said surface layer comprises nickel aluminide.

13. Mechanical seal according to claim 12, including also small but effective amounts of tantalum, molybdenum, chromium, zirconium, titanium or silicon diffused into said surface layer.

14. Mechanical seal according to claim 2, including also small but effective amounts of tantalum, molybdenum, chromium, zirconium, titanium or silicon diffused into said surface layer.

15. Mechanical seal according to claim 2, in which the first part structure surface comprises a refractory metal carbide, and a base metal binder.

16. Mechanical seal according to claim 15, in which said base metal binder is nickel, iron or cobalt.

17. Mechanical seal according to claim 15, in which said refractory metal carbide is tungsten, tantalum, titanium or zirconium carbide.

18. Mechanical seal according to claim 15, including also a refractory metal boride formed in said surface.

19. Mechanical seal according to claim 15, in which said intermetallic compound comprises an aluminide of one or more of said base metals.

20. Mechanical seal according to claim 19, in which said intermetallic compound is nickel aluminide.

21. Mechanical seal according to claim 2, in which said surface layer is about 0.002 to 0.4 millimeter in depth.

22. Mechanical seal according to claim 20, in which said surface layer is about 0.02 to 0.4 millimeter in depth.

23. Method of forming a long wearing mechanical sealing surface on a nickel, iron or cobalt base structure which includes diffusing an intermetallic compound forming element into the surface of said structure to become a mechanical sealing surface from a diffusion pack under intermetallic compound forming conditions with said base metal to replace said structure surface with said intermetallic compound.

24. The method according to claim 23, including also selecting a cobalt base tungsten carbide cermet structure as said structure.

25. The method according to claim 24, including also diffusing boron into said structure from a boronzing pack.

26. The method according to claim 23, including also selecting a cobalt base metal structure as said structure.

27. The method according to claim 26, including also diffusing boron into said structure from a boronizing pack.

* * * * *